(12) United States Patent
P et al.

(10) Patent No.: US 11,954,404 B2
(45) Date of Patent: Apr. 9, 2024

(54) VERBAL COMMUNICATION IN A VIRTUAL WORLD

(71) Applicant: QUALCOMM Incorporated, San Diego, CA (US)

(72) Inventors: Kiran P, Bengaluru (IN); Vishnu Vardhan Kasilya Sudarsan, Bangalore (IN); Rameshkumar Karuppusamy, Tirupur (IN); Udayabhanu Rao Vempati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/806,422

(22) Filed: Jun. 10, 2022

(65) Prior Publication Data

US 2023/0401029 A1    Dec. 14, 2023

(51) Int. Cl.
*G06F 3/16*    (2006.01)
*G10L 25/51*   (2013.01)
*H04L 67/131*  (2022.01)

(52) U.S. Cl.
CPC .............. *G06F 3/167* (2013.01); *G10L 25/51* (2013.01); *H04L 67/131* (2022.05)

(58) Field of Classification Search
CPC ........ G06F 3/167; G10L 25/51; H04L 67/131
See application file for complete search history.

(56) References Cited

U.S. PATENT DOCUMENTS

| 7,346,654 | B1 * | 3/2008 | Weiss | H04N 7/15 |
| | | | | 348/E7.083 |
| 9,223,786 | B1 * | 12/2015 | Hamrick | G06F 16/4393 |
| 10,341,537 | B2 | 7/2019 | Sarkar | |
| 11,184,362 | B1 * | 11/2021 | Krol | H04N 7/157 |
| 2006/0025216 | A1 * | 2/2006 | Smith | A63F 13/12 |
| | | | | 463/35 |
| 2010/0067718 | A1 | 3/2010 | Amsterdam et al. | |
| 2012/0131478 | A1 * | 5/2012 | Maor | G06T 19/20 |
| | | | | 715/757 |
| 2012/0158879 | A1 * | 6/2012 | Kurata | G10L 17/00 |
| | | | | 709/206 |
| 2012/0166969 | A1 * | 6/2012 | Gillo | A63F 13/34 |
| | | | | 715/753 |

(Continued)

FOREIGN PATENT DOCUMENTS

WO    2008125593 A2    10/2008

OTHER PUBLICATIONS

International Search Report and Written Opinion—PCT/US2023/065106—ISA/EPO—dated Jun. 29, 2023.

(Continued)

*Primary Examiner* — Rami R Okasha
(74) *Attorney, Agent, or Firm* — Patterson + Sheridan, L.L.P.\Qualcomm (57) ABSTRACT

Certain aspects of the present disclosure present a method for providing communication in a virtual world. The method generally includes receiving, via one or more microphones, voice data of a user corresponding to an avatar in the virtual world, selecting, from a plurality of devices associated with a plurality of other avatars in the virtual world, at least one device based, at least in part, on an intensity of the voice data of the user, and communicating the voice data to the selected at least one device.

28 Claims, 6 Drawing Sheets

(56) References Cited

U.S. PATENT DOCUMENTS

| | | | | |
|---|---|---|---|---|
| 2014/0064471 | A1* | 3/2014 | Krishnan | H04M 3/567 379/202.01 |
| 2018/0157333 | A1* | 6/2018 | Ross | G06F 3/013 |
| 2019/0344185 | A1* | 11/2019 | Fargo | G06T 19/20 |
| 2020/0360824 | A1* | 11/2020 | Fargo | A63F 13/87 |
| 2022/0103963 | A1* | 3/2022 | Satongar | G06F 3/0482 |
| 2022/0124130 | A1* | 4/2022 | Punwani | G06F 3/04815 |
| 2022/0311633 | A1* | 9/2022 | Jungwirth | H04N 7/15 |
| 2022/0321370 | A1* | 10/2022 | Skuratowicz | H04L 12/1827 |
| 2022/0321832 | A1* | 10/2022 | Lin | G06F 3/0481 |
| 2022/0360742 | A1* | 11/2022 | Krol | G06T 15/04 |

OTHER PUBLICATIONS

Rive P., et al., "Face to Face with the White Rabbit—Sharing Ideas in Second Life", Professional Communication Conference, 2008. IPCC 2008. IEEE International, IEEE, Piscataway, NJ, USA, Jul. 13, 2008, pp. 1-14, XP031341863, ISBN: 978-1-4244-2085-8, The whole document.

* cited by examiner

VERBAL COMMUNICATION IN A VIRTUAL WORLD

BACKGROUND

Field of the Disclosure

Aspects of the present disclosure relate to techniques for communicating in a virtual world.

Description of Related Art

The term metaverse is widely used to describe a fully immersive 3D virtual world, which includes a virtual space where users are represented by different avatars. In this way, users may interact with others, both socially and/or economically, through their respective avatars and with software agents in a cyber space. The virtual space in a metaverse is built to represent the real world, but in some cases, without the physical limitations of the real world. In a metaverse application, such as Second Life®, users are allowed to, through their avatar, for example, connect, play, work, fly, teleport, communicate, and socialize with other avatars.

Similar to the real world, interaction between avatars in the metaverse may include both verbal and nonverbal communication. Nonverbal communication may include the transmission of messages through, for example, eye contact, facial expression, gestures, posture, and/or body language of an avatar. On the other hand, verbal communication may be accomplished via speech to convey a message. In particular, one or more microphones may capture voice data of a user corresponding to an avatar in the metaverse and replay this sound in the metaverse to communicate with other avatars. Unfortunately, a user's speech replayed in the metaverse may be heard by multiple avatars, even where the user does not intend for the speech to be heard by the multiple avatars.

For example, a user corresponding to a first avatar in the metaverse may desire to have a private conversation with a second avatar in the metaverse. The first avatar and the second avatar may be in a location with a plurality of other avatars. Thus, when the first avatar begins speaking to the second avatar, not only will the second avatar be able to hear what is being said by the first avatar, but so will the other avatars in the vicinity. This may be true even in cases where the first avatar is whispering to the second avatar. In some cases, the speech directed for the second avatar may contain private and/or confidential information which the first avatar does not desire to be shared with the other avatars. In some cases, the speech directed to the second avatar, but heard by other avatars, may disturb the other avatars who are not communicating with the first avatar.

In some cases, to enable private communication between the first avatar and the second avatar, the first avatar and the second avatar may select to communicate in a private mode. Such private mode interaction may require user selection prior to such interaction. Communication selection by a user may not emulate real-world experiences of a user wishing to have a private conversation with another user, as no selection may be necessary in the real-world to privately communicate with another.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In certain aspects, a method of providing communication in a virtual world is disclosed. The method includes receiving, via one or more microphones, voice data of a user corresponding to an avatar in the virtual world, selecting, from a plurality of devices associated with a plurality of other avatars in the virtual world, at least one device based, at least in part, on an intensity of the voice data of the user, and communicating the voice data to the selected at least one device.

Other aspects provide: an apparatus operable, configured, or otherwise adapted to perform the aforementioned method and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

BRIEF DESCRIPTION OF THE DRAWINGS

The following description and the appended figures set forth certain features for purposes of illustration.

DETAILED DESCRIPTION

The present disclosure provides techniques for providing communication in a virtual world, and more specifically, techniques for automatically switching between unicast, multicast, and/or broadcast communication with other avatars in the virtual world. As used herein, automatic switching may refer to switching between unicast, multicast, and/or broadcast communication with little, or no, direct human control or manipulation.

Unicast communication may involve communication from one device associated with an avatar to another device associated with another avatar in the virtual world. Multicast communication may involve communication from one device associated with an avatar to many devices, but not all devices, associated with other avatars in the virtual world. Broadcast communication may involve communication from one device associated with an avatar to all devices, or a greater amount of devices in the virtual world than multicast communication. For example, a private conversation between two avatars in the virtual world may represent a unicast communication scenario, a work meeting between six avatars may represent a multicast communication scenario, and radio communication to a multitude of avatars (or all avatars) in the virtual world may represent a broadcast communication scenario.

Today in the virtual world, to change between private communication (e.g., unicast communication), smaller group communication (e.g., multicast communication), and/or larger group communication (e.g., broadcast communication), a user of an avatar in the virtual world may need to manually select a mode of communication, and in some cases, one or more avatars which the user desires to communicate with using this selected mode of communication. For example, a user in a classroom of twenty avatars may desire to speak to only a neighboring avatar sitting next to the user's avatar in the virtual world. To privately communicate with the neighboring avatar such that only the neighboring avatar is able to receive the verbal communication from the user, the user may need to manually select a private mode of communication, and further select the neighboring avatar as the avatar which the user desires to communicate with. After such selection, the user may communicate with the neighboring avatar. When the user no longer desires to communicate with the neighboring avatar only and instead would like to speak with all twenty avatars sitting in the classroom, the user may again change his or her mode of communication. Accordingly, communication in the virtual world may not imitate communication in the real world, given no selection in the real world is necessary for users to communicate privately and/or publicly with others.

Accordingly, aspects of the present disclosure provide techniques for automatically switching between unicast, multicast, and/or broadcast communication in the virtual world based on one or more factors. For example, in response to capturing voice data of a user corresponding to an avatar in the virtual world, one or more devices associated with other avatars in the virtual world may be automatically selected for receiving the voice data. A number of devices (corresponding to other avatars) selected, as well as, in some cases, specifically which devices are selected, may be based on (1) an intensity of the user's voice data, (2) a location of the user's avatar in the virtual world, (3) a proximity of the user's avatar to other avatars in the virtual world, (4) an orientation of the user's head, (5) an orientation of the user's avatar with respect to other avatars in the virtual world, (6) the user's eye position, (7) an avatar type selected by the user, and/or (8) a communication model selected by the user. As a result, verbal communication in the virtual world may more accurately imitate communication in the real world. Further, communication privacy may be increased, while disturbance to other users may be decreased where private communication is desired.

Various aspects of systems, apparatuses, computer program products, and methods are described more fully hereinafter for image processing. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different graphics technologies, system configurations, etc., some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs, central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
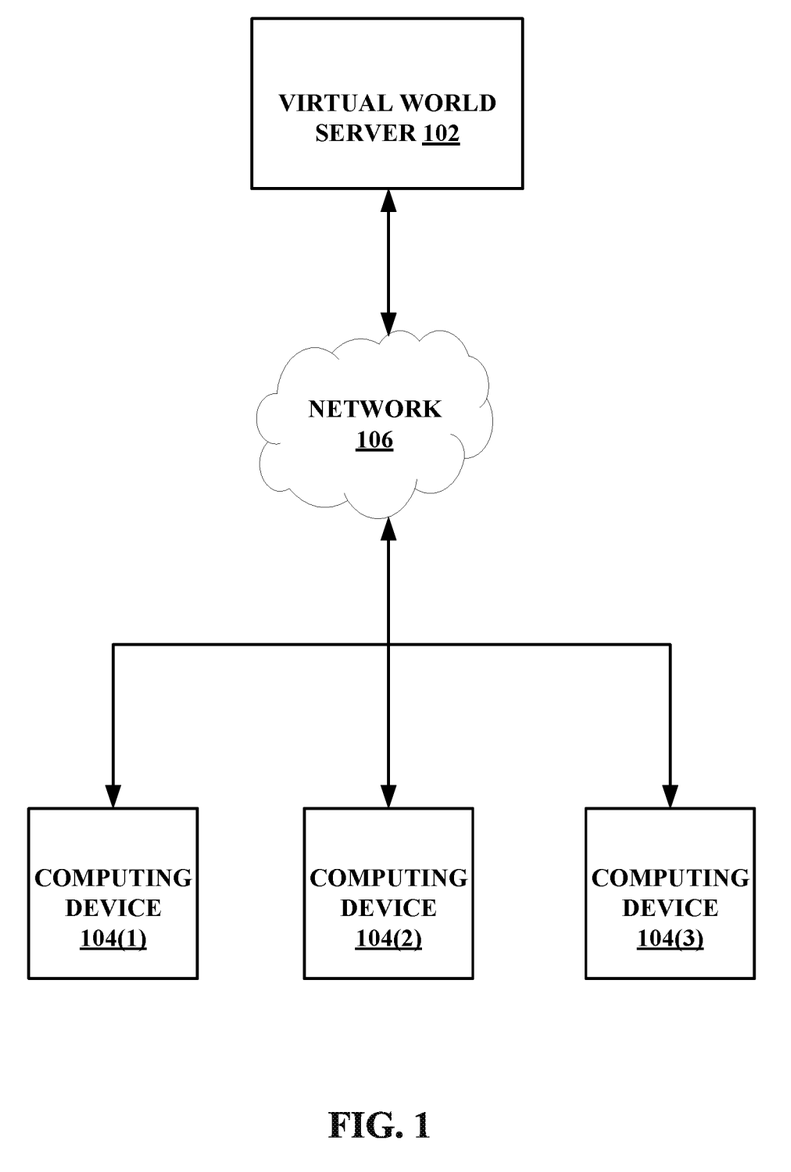
FIG. 1 is a block diagram illustrating an example computer network system, in accordance with certain aspects of the present disclosure.

FIG. 1 is a block diagram illustrating an example computer network system 100 configured to implement one or more techniques of this disclosure. Computer network system 100 includes computing devices 104(1), 104(2), and 104(3) (collectively referred to as computing devices 104 and individually referred to herein as computing device 104), a virtual world server 102, and a network 106. It should be noted that though FIG. 1 illustrates three computing devices 104 connected to virtual world server 102, an amount of computing devices 104 connected to virtual world server 102 may be different than shown.

Computing device 104 manages an interface between a system user and virtual world server 102. Computing device 104 may be connected to virtual world server 102 via a network 106. Though certain aspects are described with respect to computing devices 104 connected to virtual world server 102 via network 106, in certain other aspects, computing devices 104 may be directly connected to virtual world server 102 via a backplane or a system bus.

Computing device 104 may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. In certain aspects, computing device 104 may include one or more microphones for capturing voice data of a user using computing device 104.

Network 106 may be an external network. Network 106 may be a layer 3 (L3) physical network. Network 106 may be a public network, a wide area network (WAN) such as the Internet, a direct link, a local area network (LAN), another type of network, or a combination of these Virtual world server 102 hosts a simulated metaverse for a plurality of computing devices 104. In certain aspects, virtual world server 102 comprises an array of servers. In certain aspects, a specified area of the metaverse is simulated by a single server instance, where multiple server instances are run on a single virtual world server 102.

In certain aspects, virtual world server 102 includes a plurality of simulation servers dedicated to physics simulation (e.g., recreation of real-world occurrences) in order to manage interactions and handle collisions between characters and objects in the metaverse. In certain aspects, virtual world server 102 includes a plurality of storage servers, apart from the plurality of simulation servers, dedicated to storing data related to objects and/or avatars in the metaverse. The data stored on the plurality of storage servers may include object shapes, avatar shapes and appearances, audio clips, metaverse related scripts, and other metaverse related objects.

Figure 2:
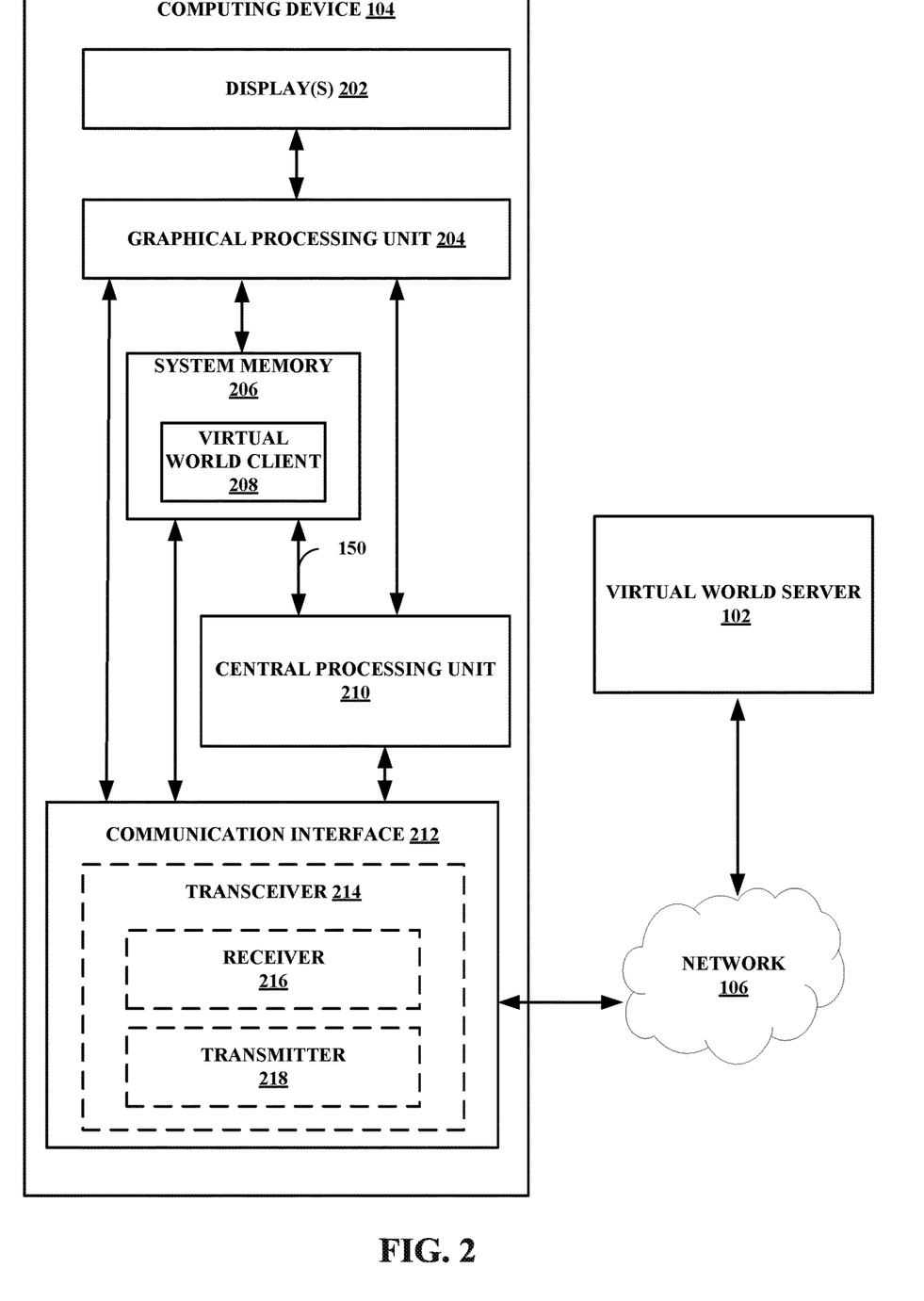
FIG. 2 is a block diagram illustrating components of an example computing device, in accordance with certain aspects of the present disclosure.

FIG. 2 is a block diagram that illustrates an example computing device 104 configured to implement one or more techniques of this disclosure. Computing device 104 may include one or more components or circuits for performing various functions described herein. In some examples, one or more components of computing device 104 may be components of a system on a chip (SOC) or integrated circuit (IC). Computing device 104 may include one or more components configured to perform one or more techniques of this disclosure. In the example shown, computing device 104 may include one or more displays 202, a graphical processing unit (GPU) 204, a central processing unit (CPU) 210, a system memory 206, and a communication interface 212. In certain aspects, communication interface 212 includes a transceiver 214 (e.g., including a receiver 216 and a transmitter 218) for communicating with virtual world server 102 via network 106.

In certain aspects, the components of computing device 104 are communicatively connected to one another by one or more buses 150. It should be noted that though certain connections are shown between components in FIG. 1, the connections between components may be different than shown. For example, all components may be coupled to a shared bus 150, different components may be coupled to different buses, etc. In certain aspects, one or more buses 150 facilitate communications related to software associated with the virtual world server 102 executing on computing device 104, including processing virtual world application commands, as well as storing, sending, and receiving data packets associated with the application software of the virtual world.

Reference to display 202 may refer to one or more displays 202. For example, display 202 may include a single display or multiple displays. GPU 204 may be configured to perform graphics processing. The one or more displays 202 may be configured to display or otherwise present frames processed by GPU 204 and/or CPU 210. In some examples, the one or more displays 202 may include one or more of: a liquid crystal display (LCD), a plasma display, an organic light emitting diode (OLED) display, a projection display device, a metaverse display device, a head-mounted display, or any other type of display device. In certain aspects, display 202 is configured to convey a visual representation of a metaverse.

Memory external to the GPU 204 and the CPU 210, such as system memory 206 (described in more detail below), may be accessible to the GPU 204 and the CPU 210. For example, GPU 204 and CPU 210 may be configured to read from and/or write to external memory, such as the system memory 206. GPU 204 and CPU 210 may be communicatively coupled to system memory 206 over a bus. In some examples, GPU 204 and CPU 210 may be communicatively coupled to each other over the bus or a different connection.

GPU 204 may be a general purpose GPU, or any other processing unit that may be configured to perform graphics processing. In some examples, GPU 204 may be integrated into a motherboard of computing device 104. In some examples, GPU 204 may be present on a graphics card that is installed in a port in a motherboard of computing device 104, or may be otherwise incorporated within a peripheral device configured to interoperate with computing device 104. GPU 204 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, GPU 204 may store instructions for the software in a suitable, non-transitory computer-readable storage medium, e.g., system memory 206, and may execute the instructions in hardware using one or more processors to perform the techniques of this disclosure. Any of the foregoing, including hardware, software, a combination of hardware and software, etc., may be considered to be one or more processors.

CPU 210 may be any processing unit configured to send instructions to GPU 204 and perform general computational processing (e.g., non-graphical processing). In some examples, CPU 210 may be integrated into a motherboard of computing device 104. CPU 210 may include one or more processors, such as one or more microprocessors, ASICs, FPGAs, ALUs, DSPs, video processors, discrete logic, software, hardware, firmware, other equivalent integrated or discrete logic circuitry, or any combinations thereof. If the techniques are implemented partially in software, CPU 210 may store instructions for the software in a suitable, non-transitory computer-readable storage medium, e.g., system memory 206, and may execute the instructions in hardware using one or more processors to perform the techniques of this disclosure. Any of the foregoing, including hardware, software, a combination of hardware and software, etc., may be considered to be one or more processors.

System memory 206 may include one or more volatile or non-volatile memories or storage devices. In some examples, system memory 206 may include RAM, static RAM (SRAM), dynamic RAM (DRAM), erasable programmable ROM (EPROM), EEPROM, flash memory, a magnetic data media or an optical storage media, or any other type of memory.

System memory 206 may be a non-transitory storage medium according to some examples. The term "non-transitory" may indicate that the storage medium is not embodied in a carrier wave or a propagated signal. However, the term "non-transitory" should not be interpreted to mean that system memory 206 is non-movable or that its contents are static. As one example, system memory 206 may be removed from computing device 104 and moved to another device. As another example, system memory 206 may not be removable from computing device 104.

In certain aspects, system memory 206 includes a virtual world client 208. Virtual world client 208 is stored as computer readable instructions in system memory 206. Virtual world client 208 may include processes and functions which are executed on CPU 210 within computing device 104. It should be noted that though FIG. 2 illustrates virtual world client 208 stored in system memory 206, in certain other embodiments, virtual world client 208 may be stored in a storage device, such as within computing device 104.

In certain aspects, virtual world client 208 is a client program executed on computing device 104. Virtual world client 208 may enable a user of computing device 104 to connect to a virtual world server 102 over network 106. Virtual world client 208 may be further configured to enable the user of computing device 104 to interact with other users on other computing devices 104 that are also connected to virtual world server 102.

Computing device 104 may use communication interface 212 to communicate with virtual world server 102, connected by network 106. Communication interface 212 may include a receiver 216 and a transmitter 218. Receiver 216 may be configured to perform any receiving function described herein with respect to computing device 104. Additionally, receiver 216 may be configured to receive information from another device or virtual world server 102. Transmitter 218 may be configured to perform any transmitting function described herein with respect to computing device 104. For example, transmitter 218 may be configured to transmit information to another device or virtual world server 102. Receiver 216 and transmitter 218 may be combined into a transceiver 214. In such examples, transceiver 214 may be configured to perform any receiving function and/or transmitting function described herein with respect to computing device 104.

Processes herein may be described as performed by a particular hardware component (e.g., a GPU), but, in further embodiments, can be performed using other hardware components (e.g., a CPU), consistent with disclosed embodiments.

Accordingly, aspects of the present disclosure provide techniques for automatically switching between unicast, multicast, and/or broadcast communication in the virtual world based on one or more factors. In particular, a number of devices automatically selected for receiving communication in the virtual world from a user may be based on one or more factors, including (1) an intensity of the user's voice data, (2) a location of the user's avatar in the virtual world, (3) a proximity of the user's avatar to other avatars in the virtual world, (4) an orientation of the user's head, (5) an orientation of the user's avatar with respect to other avatars in the virtual world, (6) the user's eye position, (7) an avatar type selected by the user, and/or (8) a communication model selected by the user. Selection of one or more devices may be described in more detail with respect to FIG. 3.

Figure 3:
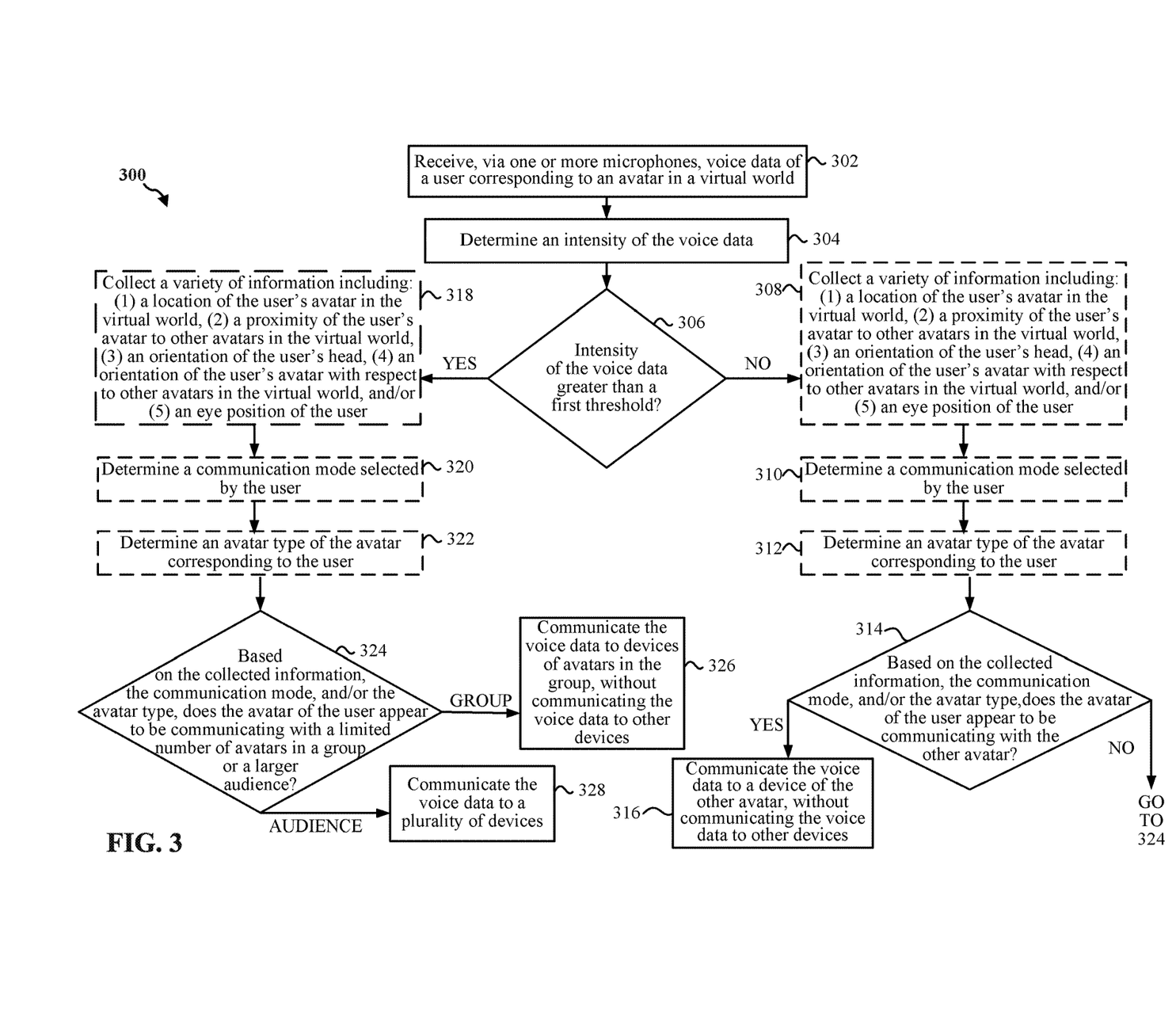
FIG. 3 is a workflow illustrating example operations for providing communication in a virtual world, in accordance with certain aspects of the present disclosure.

FIG. 3 is a workflow illustrating example operations 300 for providing communication in a virtual world, in accordance with certain aspects of the present disclosure. Operations 300 of FIG. 3 may be performed, for example, by components of computer network system 100 illustrated in FIG. 1. Operations 300 may be used to select at least one device from a plurality of devices associated with a plurality of avatars in a virtual world for receiving communication from a user (e.g., also represented as an avatar in the virtual world). In other words, operations 300 may be used to automatically switch between unicast, multicast, and/or broadcast communication for a user.

Operations 300 begin, at operation 302, by a computing device, such as computing device 104 illustrated in FIGS. 1 and 2, receiving, via one or more microphones on computing device 104, voice data of a user corresponding to an avatar in a virtual world. In certain aspects, a voice activity detection (VAD) algorithm may be used to detect whether signals received by the one or more microphones contain speech (e.g., voice data) from a user. In certain aspects, the VAD algorithm may periodically (e.g., every 20 milliseconds (ms)) detect whether signals captured by the one or more microphones contain voice data. Example VAD functionality may be included in Qualcomm Fluence™ Pro voice input technology made commercially available from Qualcomm, Inc. of San Diego, California.

At operation 304, computing device 104 determines an intensity of the voice data of the user. Voice input technology may be implemented at computing device 104 for determining the vocal intensity. Example voice input technology for vocal intensity determination may be Qualcomm Fluence™ Pro voice input technology.

Measurement of vocal intensity may be useful in determining the dynamics of a user's voice. For example, vocal intensity may correlate with the perception of vocal loudness; thus, where vocal intensity of the voice data is high, a user may be considered to be speaking loudly, and where vocal intensity of the voice data is low, a user may be considered to be speaking more softly. In certain aspects, a user speaking loudly may indicate that the user is intending to speak publicly (e.g., to a group of avatars), whereas a user speaking more softly may indicate that the user is intending to speak privately (e.g., to only one other avatar). As such, intensity of the voice data measured at operation 304 may help to determine whether a user intends to speak to a single avatar or to a larger group of avatars in the virtual world, and thereby eliminate the need for user input indicating such intention.

At operation 306, the intensity of the voice data is compared to a first threshold. The first threshold may indicate a vocal intensity level that must be exceeded to determine that the user is intending to speak to more than one avatar. In other words, the first threshold may be the vocal intensity boundary between communication with one avatar and communication with more than one avatar. For example, in cases where the intensity of the voice data does not satisfy the first threshold, the user may be intending to communicate with only one avatar. On the other hand, in cases where the intensity of the voice data does satisfy the first threshold, the user may be intending to communicate with more than one avatar.

In certain aspects, the first threshold is the same for multiple users. In certain aspects, the first threshold is configured per user and/or learned for the user based on intensity of voice data received, via the one or more microphones, for the user, over time. Accordingly, a first threshold for a first user may be different than a first threshold for a second user.

In certain aspects, determining whether to communicate with one avatar or communicate with more than one avatar may be based solely on the intensity of the voice data determined at operation 304. Thus, in such aspects, after determining whether the intensity of the voice data is greater than the first threshold at operation 306, one device or more than one device associated with different avatars may be selected for receiving the voice data.

In certain other aspects, however, other factors may be considered in determining whether the user in fact intending to communicate with one avatar or more than one avatar. For example, where, at operation 306, the intensity of the voice data is determined not to be greater than the first threshold (e.g., is less than the first threshold) and it is assumed that the user is intending to speak to privately to only one other avatar, optional other factors may be considered to confirm this assumption.

In certain aspects, the other factors may include (1) a location of the user's avatar in the virtual world, (2) a proximity of the user's avatar to other avatars in the virtual world, (3) an orientation of the user's head, (4) an orientation of the user's avatar with respect to other avatars in the virtual world, and/or (5) the user's eye position. Accordingly, at operation 308, a variety of information may be collected by computing device 104, wherein the information includes at least one factor.

In certain aspects, the location of the user's avatar in the virtual world may aid in determining whether a user is intending to communicate with one avatar or more than one avatar. For example, it may be assumed that when the user's avatar is located in a cubicle in an office in the virtual world, the user is intending to communicate with only one other avatar, whereas, on the other hand, it may be assumed that when the user's avatar is located in a classroom in the virtual world, the user is intending to communicate with more than one avatar.

In certain aspects, the proximity of the user's avatar to other avatars in the virtual world may aid in determining whether a user is intending to communicate with one avatar or more than one avatar. In particular, an avatar which is determined to be close in distance to the user's avatar may be an avatar which the user is intending to communicate with. Alternatively, an avatar which is determined to be further in distance from the user's avatar may not be an avatar which the user is intending to communicate with. For example, in a park with five avatars including the user's avatar, one avatar may be standing near the user's avatar (e.g., a small distance away from the user's avatar) in a first section of the park while the three other avatars may be standing in a second section of the park. The second section of the park may be opposite the first section of the park. Accordingly, computing device 104 may determine that the user's avatar is in close proximity to the one avatar in the first section of the park and not in close proximity to the other three avatars in the second section of the park. Based on this determination, it may be assumed that the user is intending to communicate with only one avatar, e.g., the avatar in the first section of the park, as opposed to multiple avatars (e.g., not intending to communicate with the three other avatars in the second section of the park).

In certain aspects, a location of each avatar may be determined by calculating the coordinates of each avatar in the virtual world. Coordinates for each avatar may be periodically or aperiodically re-determined to account for movement of each avatar in the virtual world (even in cases where an avatar has remained at a constant position). The proximity of the user's avatar to other avatars in the virtual world may be determined based on such coordinates.

In certain aspects, an orientation of the user's head may aid in determining whether a user is intending to communicate with one avatar or more than one avatar. Further, in certain aspects, an orientation of the user's head may aid in determining which avatar(s) a user is intending to communicate with. For example, where a user's head is oriented towards the location of another avatar in the virtual world, the user may be intending to communicate with this other avatar. As another example, where the user is surrounded by multiple avatars, and the user is speaking without orienting their head towards a particular avatar in the room, the user may be intending to communicate with more than one avatar (e.g., more than one avatar in the room). As another example, where a user's avatar is sitting next to two avatars (e.g., one avatar to the user's avatar's left and one avatar to the user's avatar's right) and turns the orientation of their head from the left to the right, the user may be intending to switch their communication from speaking with the avatar on their left to the avatar on their right.

In certain aspects, the orientation of the user's head may be determined using an inertial measurement unit (IMU). In certain aspects, computing device 104 may include the IMU. An IMU describes a collection of measurement tools. When installed in computing device 104, measurement tools of the IMU may capture data about the movement of computing device 104. The IMUS may contain sensors such as accelerometers, gyroscopes, magnetometers, and/or the like. Accordingly, the IMU may be capable of measuring a variety of factors, including speed, direction, acceleration, specific force, angular rate, and/or magnetic fields surrounding the computing device 104. In certain aspects, data collected by the IMU may include head movement of a user. The head movement of the user may be used to identify a direction of the user's head when voice data is captured for the user (e.g., which indicates in what direction the user is intending the speech to be communicated). In certain aspects, IMU data may include three degrees of freedom (3DoF) data which may contain information about the rotational movement of computing device 104 (e.g., the rotational movement of the user's head where computing device 104 is a headset). In certain aspects, IMU data may contain field of view (FoV) data. FoV is the range of the observable virtual world visible at any given time through the human eye. FoV data may change as a user rotates their head and/or changes an orientation of their head.

In certain aspects, an orientation of a user's avatar with respect to other avatars in the virtual world may aid in determining whether a user is intending to communicate with one avatar or more than one avatar. For example, where a user is oriented towards another avatar in the virtual world, and the other avatar is oriented towards the user's avatar, the user may be intending to communicate with this other avatar. As another example, where a user is not oriented towards a particular avatar, but multiple avatars are oriented (e.g., at different angles) towards the user's avatar, the user may be intended to communicate with all of these other avatars oriented towards the user's avatar.

In certain aspects, the user's eye position may aid in determining whether a user is intending to communicate with one avatar or more than one avatar. Generally, eye contact is maintained between avatars whom are engaged in conversation. Thus, the user's eye position may help to identify whom the user is intending to communicate with.

In certain aspects, at least one factor determined at operation 308 (and described in detail above) may be used to confirm whether the user is, in fact, intending to communicate with one avatar (e.g., given the voice intensity was determined to be below the first threshold at operation 306).

In certain other aspects, other factors, beyond the information collected at operation 308, may be considered in determining whether the user in fact intending to communicate with one avatar or more than one avatar. For example, where, at operation 306, the intensity of the voice data is determined not to be greater than the first threshold (e.g., is less than the first threshold) and it is assumed that the user is intending to speak to privately to only one other avatar, optional other factors (e.g., in addition to or alternative to the information collected at operation 308) may be considered to confirm this assumption.

In certain aspects, the other factors may include (1) a communication mode selected by the user and/or (2) an avatar type selected by the user. Accordingly, in some cases, at operation 310, a communication mode selected by the user may be determined. Further, in some cases, at operation 312, the user's avatar type may be determined.

In other words, user input may be considered when determining whether the user is intending to communicate with one or more avatars. As mentioned herein, in some cases, a user may select to communicate in a private mode with another avatar in the virtual world. The user may select, in some cases via gesture control, the private mode and/or the particular avatar the user wishes to speak privately with. Accordingly, this selection may be taken into consideration when determining whether the communication should be unicast, multicast, or broadcast to other avatar(s) in the virtual world.

In certain aspects, an avatar selected by the user may also be taken into consideration. For example, in some cases, a user may select an avatar with a microphone. Microphones are used in many applications, such as concert halls, public events, etc., to amplify voice of a speaker. Accordingly, where a user selects an avatar with a microphone, the user may be intending to enhance their voice such that they are able to communicate with a larger crowd. As such, the user's selection of an avatar with a microphone may indicate that the user is not intending to speak private (e.g., to only one other avatar), and instead intends to communicate with multiple avatars in the virtual world.

At operation 314, at least one factor determined at operation 308, the communication mode determined at operation 310, and/or the avatar type determined at operation 312, may be used to confirm whether the user is, in fact, intending to communicate with one avatar (e.g., given the voice intensity was determined to be below the first threshold at operation 306). Where the user is confirmed to be communicating with only one other avatar in the virtual world, at operation 316, the voice data of the user is communicated to a device of the other avatar. The voice data may be communicated to the device of the other avatar without communicating the voice data to devices of other avatars in the virtual world.

On the other hand, where the user is not confirmed to be communicating with only one other avatar in the virtual world, at operation 324, at least one factor determined at operation 308, the communication mode determined at operation 310, and/or the avatar type determined at operation 312, may be used to confirm whether the user is intending to communicate with a limited number of avatars in a group or a larger audience. In some cases, it may be determined that the user is intending to communicate with a limited number of avatars in a group. Accordingly, at operation 326, the voice data of the user is communicated to devices of avatars in the group without communicating the voice data to devices of other avatars not in the group in the virtual world. In some cases, it may be determined that the user is intending to communicate with a larger audience (e.g., greater number of avatars). Accordingly, at operation 328, the voice data of the user is communicated to a plurality of devices corresponding to avatars in the larger audience (e.g., broadcast communication).

Returning to operation 306, where the intensity of the voice data (e.g., determined at operation 304) does satisfy the first threshold, the user may be intending to communicate with more than one avatar. In certain aspects, determining whether to communicate with one avatar or communicate with more than one avatar may be based solely on the intensity of the voice data determined at operation 304. Thus, in such aspects, after determining the intensity of the voice data is greater than the first threshold at operation 306, more than one device associated with different avatars may be selected for receiving the voice data.

In certain other aspects, however, other factors may be considered in determining whether the user in fact intending to communicate with more than one avatar. For example, where, at operation 306, the intensity of the voice data is determined to be greater than the first threshold and it is assumed that the user is intending to speak to more than one avatar, optional other factors may be considered to confirm this assumption.

In certain aspects, the other factors may include (1) a location of the user's avatar in the virtual world, (2) a proximity of the user's avatar to other avatars in the virtual world, (3) an orientation of the user's head, (4) an orientation of the user's avatar with respect to other avatars in the virtual world, and/or (5) the user's eye position. Accordingly, at operation 318, a variety of information may be collected by computing device 104, wherein the information includes at least one factor.

In certain aspects, the other factors may include (1) a communication mode selected by the user and/or (2) an avatar type selected by the user. Accordingly, in some cases, at operation 320, a communication mode selected by the user may be determined. Further, in some cases, at operation 322, the user's avatar type may be determined.

At operation 324, at least one factor determined at operation 308, the communication mode determined at operation 310, and/or the avatar type determined at operation 312, may be used to determine whether the user is intending to communicate with a limited number of avatars in a group or a larger audience. In some cases, it may be determined that the user is intending to communicate with a limited number of avatars in a group. Accordingly, at operation 326, the voice data of the user is communicated to devices of avatars in the group without communicating the voice data to devices of other avatars not in the group in the virtual world. In some cases, it may be determined that the user is intending to communicate with a larger audience (e.g., greater number of avatars). Accordingly, at operation 328, the voice data of the user is communicated to a plurality of devices corresponding to avatars in the larger audience (e.g., broadcast communication).

Although not illustrated in FIG. 3, in certain aspects, after determining the intensity of the voice data is greater than a first threshold (e.g., satisfies the first threshold), the intensity of the voice data may be compared to a second threshold. The second threshold may indicate a vocal intensity level that must be exceeded to determine that the user is intending to speak to a larger audience of avatars as opposed to a limited number of avatars. In other words, the second threshold may be the vocal intensity boundary between communication with a limited number of avatars in a group and communication with a larger audience of avatars. For example, in cases where the intensity of the voice data does not satisfy the second threshold, the user may be intending to communicate with a limited number of avatars in a group (e.g., multicast communication). On the other hand, in cases where the intensity of the voice data does satisfy the second threshold, the user may be intending to communicate with a larger audience of avatars (e.g., broadcast communication).

Further, though FIG. 3 illustrates comparing the intensity of the voice data to a first threshold to determine whether the user is intending to communicate with one avatar or more than one avatar, in certain other aspects, one or more other factors described herein may be used to determine whether the user is intending to communicate with one avatar or more than one avatar, without determining whether the user's voice intensity satisfies the first threshold.

Figure 4:
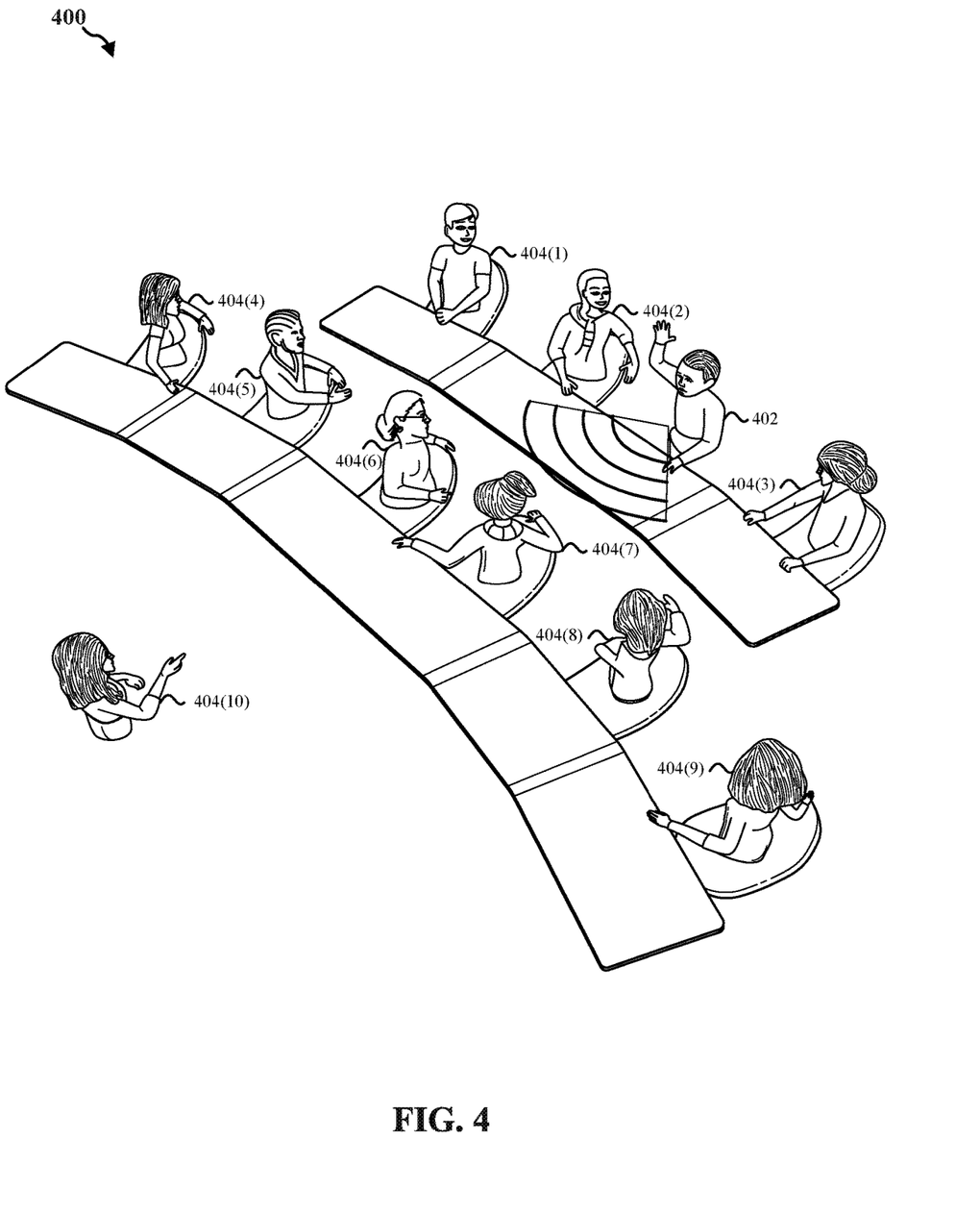
FIG. 4 illustrates an example group communication scenario between multiple avatars, in accordance with certain aspects of the present disclosure.

FIG. 4 illustrates an example group communication scenario 400 between multiple avatars, in accordance with certain aspects of the present disclosure. Example group communication scenario 400 may be described with respect to operations 300 of FIG. 3.

As shown in FIG. 4, a user (of a computing device 104) represented by avatar 402 (referred to herein as user 402) in a virtual world may be located in a classroom with a plurality of other avatars 404(1)-404(10) (collectively referred to herein as other avatars 404). User 402 may desire to communicate with other avatars 404.

According to operations 300 illustrated in FIG. 3, at operation 302, computing device 104 receives, via one or more microphones on computing device 104, voice data of user 402. At operation 304, computing device 104 determines an intensity of the voice data of user 402. At operation 306, the intensity of the voice data is compared to a first threshold. In scenario 400, user 402 is intending to speak loud enough such that avatars 404 are able to hear what user 402 is saying. Thus, the intensity of user 402's voice data may satisfy the first threshold (e.g., may be above the first threshold). Accordingly, it may be assumed that user 402 is attempting to communicate with more than one avatar. However, this assumption may be confirmed based on one or more other factors.

In particular, at operation 318, a variety of information may be collected by computing device 104. For example, computing device 104 may determine that user 402 is in a classroom setting. Computing device 104 may identify a location of each of user 402 and other avatars 404 in the virtual world and determine that user 402 is in close proximity to each of avatars 404. Computing device 104 may determine user 402 is not oriented towards any particular avatar 404. Computing device 104 may determine that user 402's eye position is continuously changing such that user 402 is able to make eye contact with each avatar 404 while talking.

In some cases, at operation 320, computing device 104 may determine that user 402 has not selected a private communication mode. Further, in some cases, at operation 322, computing device 104 may determine that user 402 has not selected an avatar with a microphone.

Based on one or more of the factors/information collected/determined at operation 318, operation 320, and/or operation 322, computing device 104 may determine that user 402 intends to communicate with a limited number of avatars in a group, and more specifically, the ten avatars 404 in the classroom. Accordingly, computing device 104 may select ten devices associated with the ten avatars in the virtual world, and communicate the voice data from user 402 to the selected ten devices.

Figure 5:
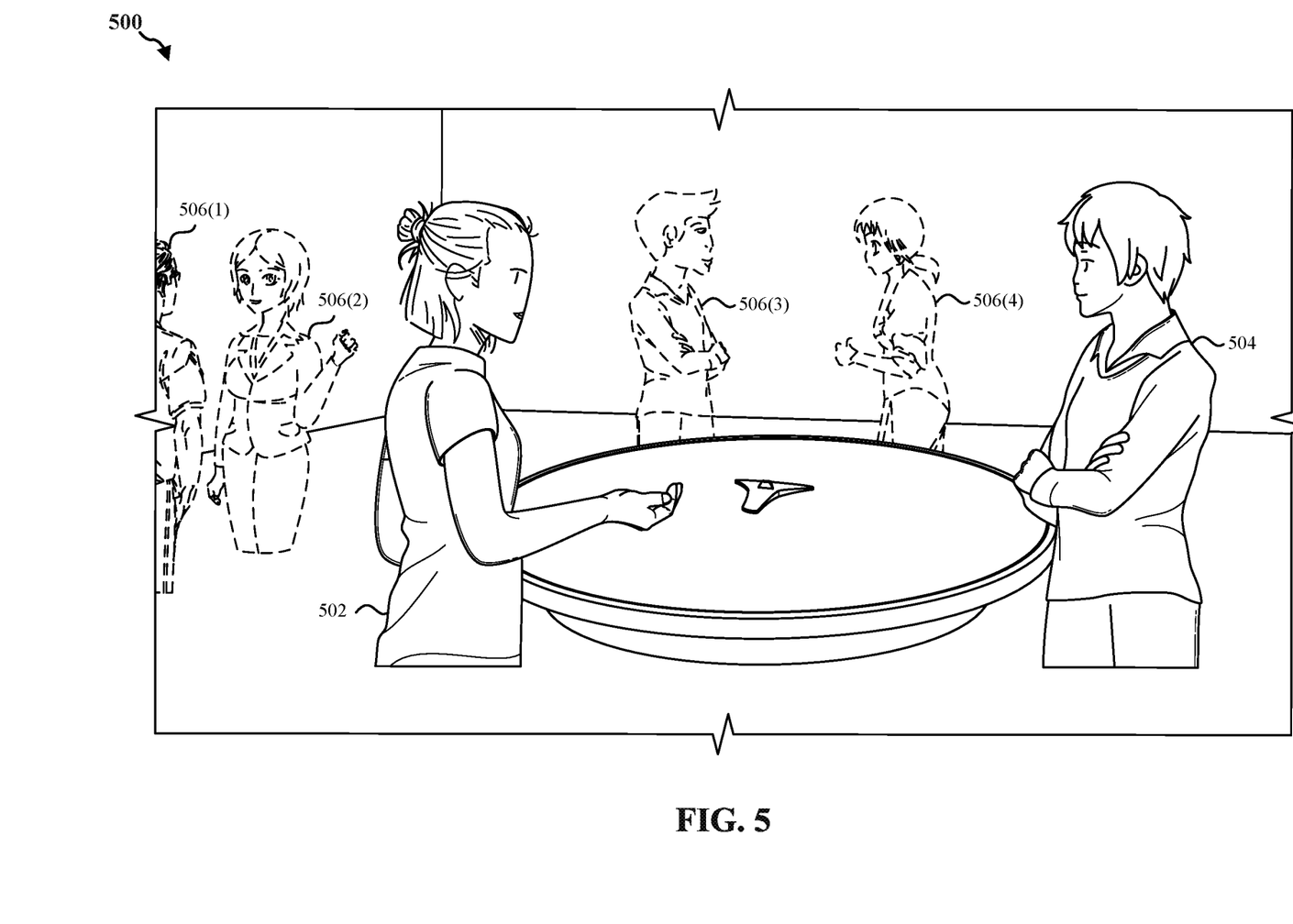
FIG. 5 illustrates an example private communication scenario between two avatars, in accordance with certain aspects of the present disclosure.

FIG. 5 illustrates an example private communication scenario 500 between two avatars, in accordance with certain aspects of the present disclosure. Example private communication scenario 500 may be described with respect to operations 300 of FIG. 3.

As shown in FIG. 5, a user (of computing device 104) represented by avatar 502 (referred to herein as user 502) in a virtual world may be located in a room with five other avatars, for example, avatar 504 and other avatars 506(1)-506(4) (collectively referred to herein as other avatars 506). User 502 may desire to communicate with only avatar 504, and not communicate with avatars 506.

According to operations 300 illustrated in FIG. 3, at operation 302, computing device 104 receives, via one or more microphones on computing device 104, voice data of user 502. At operation 304, computing device 104 determines an intensity of the voice data of user 502. At operation 306, the intensity of the voice data is compared to a first threshold. In scenario 500, user 502 is intending to speak loud enough such that only avatar 504 is able to hear what he is saying. Thus, the intensity of user 502's voice data may not satisfy the first threshold (e.g., may be below the first threshold). Accordingly, it may be assumed that user 502 is attempting to communicate with only one avatar. However, this assumption may be confirmed based on one or more other factors.

In particular, at operation 308, a variety of information may be collected by computing device 104. For example, computing device 104 may determine that user 402 is in a room having a capacity large enough, for example, for twenty avatars. Computing device 104 may identify a location of each of user 502, avatar 504, and other avatars 506 in the virtual world and determine that user 502 is closer in proximity to avatar 504 than any one of the other avatars 506. Computing device 104 may determine that user 502 is oriented towards avatar 504 (e.g., user 502's head is oriented towards avatar 504). Computing device 104 may determine that user 502's eye position is focused on avatar 504 while user 502 is speaking.

In some cases, at operation 310, computing device 104 may determine that user 502 has selected a private communication mode. Further, in some cases, at operation 322, computing device 104 may determine that user 502 has not selected an avatar with a microphone.

Based on one or more of the factors/information collected/determined at operation 308, operation 310, and/or operation 312, computing device 104 may confirm that user 502 intends to communicate with only one avatar, and more specifically, avatar 504. Accordingly, computing device 104 may select a device associated with avatar 504, and communicate the voice data from user 502 to the selected device. The voice data may not be communicated to devices associated with other avatars 506. As such, communication between user 502 and avatar 504 may remain private, while also not disturbing other avatars 506.

Figure 6:
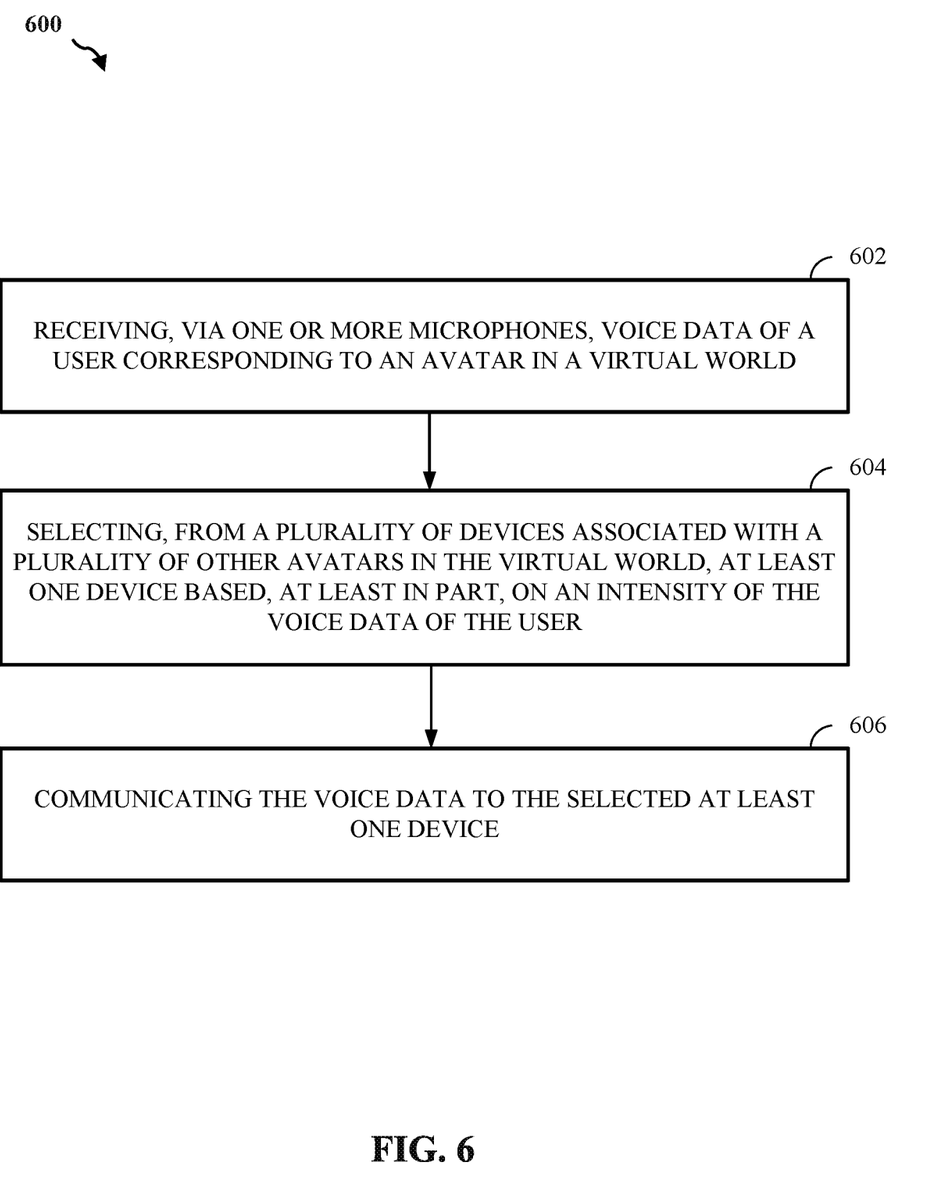
FIG. 6 is a flow diagram illustrating example operations for providing communication in a virtual world, in accordance with certain aspects of the present disclosure.

FIG. 6 is a flow diagram illustrating example operations 600 for image processing, in accordance with certain aspects of the present disclosure. Operations 600 may be performed, for example, by a computing device (e.g., computing device 104 of FIG. 1).

Operations 600 begin, at a first block 602, by receiving, via one or more microphones, voice data of a user corresponding to an avatar in the virtual world.

Operations 600 continue, at a second block 604, by selecting, from a plurality of devices associated with a plurality of other avatars in the virtual world, at least one device based, at least in part, on an intensity of the voice data of the user.

In certain aspects, selecting the at least one device is based on whether the intensity satisfies a first threshold. In certain aspects, when the intensity does not satisfy the first threshold, the at least one device is a single device of the plurality of devices. In certain aspects, when the intensity does satisfy the first threshold, the at least one device comprises multiple devices of the plurality of devices. The first threshold may be learned for the user based on intensity of voice data received, via the one or more microphones, for the user, over time.

In certain aspects, selecting the at least one device is further based on whether the intensity satisfies a second threshold.

In certain aspects, selecting the at least one device is further based on at least one of: a location of the avatar in the virtual world, a proximity of the avatar to each of the plurality of other avatars in the virtual world, an orientation of a head of the user, an orientation of the avatar in the virtual world with respect to each of the plurality of other avatars, an eye position of the user.

In certain aspects, selecting the at least one device is further based on an avatar type of the avatar corresponding to the user.

In certain aspects, selecting the at least one device is further based on a communication mode selected by the user.

Operations 600 continue, at a third block 606, by communicating the voice data to the selected at least one device. The voice data may be communicated to the selected at least one device without communicating the voice data to other non-selected devices from the plurality of devices

Example Clauses

Implementation examples are described in the following numbered clauses:

Clause 1: A method of providing communication in a virtual world, comprising: receiving, via one or more microphones, voice data of a user corresponding to an avatar in the virtual world; selecting, from a plurality of devices associated with a plurality of other avatars in the virtual world, at least one device based, at least in part, on an intensity of the voice data of the user; and communicating the voice data to the selected at least one device.

Clause 2: The method of Clause 1, wherein the voice data is communicated to the selected at least one device without communicating the voice data to other non-selected devices from the plurality of devices.

Clause 3: The method of any one of Clauses 1-2, wherein selecting the at least one device is based on whether the intensity satisfies a first threshold.

Clause 4: The method of Clause 3, wherein when the intensity does not satisfy the first threshold, the at least one device is a single device of the plurality of devices.

Clause 5: The method of Clause 4, wherein when the intensity does satisfy the first threshold, the at least one device comprises multiple devices of the plurality of devices.

Clause 6: The method of any one of Clauses 3-5, wherein selecting the at least one device is further based on whether the intensity satisfies a second threshold.

Clause 7: The method of any one of Clauses 3-6, wherein the first threshold is learned for the user based on intensity of voice data received, via the one or more microphones, for the user, over time.

Clause 8: The method of any one of Clauses 1-7, wherein selecting the at least one device is further based on at least one of: a location of the avatar in the virtual world; a proximity of the avatar to each of the plurality of other avatars in the virtual world; an orientation of a head of the user; an orientation of the avatar in the virtual world with respect to each of the plurality of other avatars; or an eye position of the user.

Clause 9: The method of any one of Clauses 1-8, wherein selecting the at least one device is further based on an avatar type of the avatar corresponding to the user.

Clause 10: The method of any one of Clauses 1-9, wherein selecting the at least one device is further based on a communication mode selected by the user.

Clause 11: An apparatus, comprising: a memory comprising executable instructions; and a processor configured to execute the executable instructions and cause the apparatus to perform a method in accordance with any one of Clauses 1-10.

Clause 12: An apparatus, comprising means for performing a method in accordance with any one of Clauses 1-10.

Clause 13: A non-transitory computer-readable medium comprising executable instructions that, when executed by a processor of an apparatus, cause the apparatus to perform a method in accordance with any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of providing communication in a virtual world, comprising:
  receiving, via one or more microphones, voice data of a user corresponding to an avatar in the virtual world;
  selecting a communication mode based on an intensity of the voice data of the user, a first threshold, and a second threshold, wherein the selecting comprises:
    selecting a unicast communication mode when the intensity of the voice data of the user is less than the first threshold;
    selecting a multicast communication mode when the intensity of the voice data of the user is less than the second threshold and greater than or equal to the first threshold; and
    selecting a broadcast communication mode when the intensity of the voice data of the user is greater than or equal to the second threshold; and
  communicating the voice data of the user, using the selected communication mode, to at least one device of a plurality of devices associated with a plurality of other avatars in the virtual world.

2. The method of claim 1, further comprising selecting the at least one device based on a gesture performed by the user and on the intensity of the voice data of the user.

3. The method of claim 2, wherein selecting the at least one device is based on whether the intensity of the voice data satisfies the first threshold.

4. The method of claim 3, wherein when the intensity is less than the first threshold, selecting the at least one device comprises selecting a single device of the plurality of devices for unicast communication in the unicast communication mode.

5. The method of claim 4, wherein:
when the intensity of the voice data is less than the second threshold and greater than or equal to the first threshold, selecting the at least one device comprises selecting multiple devices of the plurality of devices for multicast communication in the multicast communication mode; and
when the intensity of the voice data is greater than or equal to the second threshold selecting the at least one device comprises, selecting the plurality of devices for broadcast communication in the broadcast communication mode.

6. The method of claim 3, wherein the first threshold is learned for the user based on intensity of voice data received, via the one or more microphones, for the user, over time.

7. The method of claim 2, wherein selecting the at least one device is further based on at least one of:
a location of the avatar in the virtual world;
a proximity of the avatar to each of the plurality of other avatars in the virtual world;
an orientation of a head of the user;
an orientation of the avatar in the virtual world with respect to each of the plurality of other avatars; or
an eye position of the user.

8. The method of claim 2, wherein selecting the at least one device is further based on an avatar type of the avatar corresponding to the user.

9. An apparatus configured for providing communication in a virtual world, comprising:
one or more processors individually or collectively configured to execute instructions stored on one or more memories and to cause the apparatus to:
receive, via one or more microphones, voice data of a user corresponding to an avatar in the virtual world;
select a communication mode based on an intensity of the voice data of the user a first threshold, and a second threshold, wherein, in order to select the communication mode, the one or more processors are configured to cause the apparatus to:
select a unicast communication mode when the intensity of the voice data of the user is less than the first threshold;
select a multicast communication mode when the intensity of the voice data of the user is less than the second threshold and greater than or equal to the first threshold; and
select a broadcast communication mode when the intensity of the voice data of the user is greater than or equal to the second threshold; and
communicate the voice data of the user, using the selected communication mode, to at least one device of a plurality of devices associated with a plurality of other avatars in the virtual world.

10. The apparatus of claim 9, wherein the one or more processors are further configured to cause the apparatus to select the at least one device based on a gesture performed by the user and on the intensity of the voice data of the user.

11. The apparatus of claim 10, wherein the one or more processors are further configured to cause the apparatus to select the at least one device based on whether the intensity of the voice data satisfies the first threshold.

12. The apparatus of claim 11, wherein when the intensity of the voice data is less than the first threshold, the one or more processors are configured to select a single device of the plurality of devices as the at least one device for unicast communication in the unicast communication mode.

13. The apparatus of claim 12, wherein:
when the intensity of the voice data is less than the second threshold and greater than or equal to the first threshold, the one or more processors are configured to select multiple devices of the plurality of devices as the at least one device for multicast communication in the multicast communication mode; and
when the intensity of the voice data is greater than or equal to the second threshold, the one or more processors are configured to select the plurality of devices as the at least one device for broadcast communication in the broadcast communication mode.

14. The apparatus of claim 11, wherein the one or more processors are further configured to cause the apparatus to learn the first threshold for the user based on intensity of voice data received, via the one or more microphones, for the user, over time.

15. The apparatus of claim 10, wherein the one or more processors are configured to cause the apparatus to select the at least one device further based on at least one of:
a location of the avatar in the virtual world;
a proximity of the avatar to each of the plurality of other avatars in the virtual world;
an orientation of a head of the user;
an orientation of the avatar in the virtual world with respect to each of the plurality of other avatars; or
an eye position of the user.

16. The apparatus of claim 10, wherein the one or more processors are configured to cause the apparatus to select the at least one device further based on an avatar type of the avatar corresponding to the user.

17. An apparatus for providing communication in a virtual world, comprising:
means for receiving, via one or more microphones, voice data of a user corresponding to an avatar in the virtual world;
means for selecting a communication mode based on an intensity of the voice data of the user, a first threshold, and a second threshold, wherein the means for selecting comprises:
means for selecting a unicast communication mode when the intensity of the voice data of the user is less than the first threshold;
means for selecting a multicast communication mode when the intensity of the voice data of the user is less than the second threshold and greater than or equal to the first threshold; and
means for selecting a broadcast communication mode when the intensity of the voice data of the user is greater than or equal to the second threshold; and
means for communicating the voice data of the user, using the selected communication mode to at least one device of a plurality of devices associated with a plurality of other avatars in the virtual world.

18. The apparatus of claim 17, further comprising means for selecting the at least one device based on a gesture performed by the user and on the intensity of the voice data of the user.

19. The apparatus of claim 18, wherein the means for selecting the at least one device is configured to select the at least one device based on whether the intensity of the voice data satisfies the first threshold.

20. The apparatus of claim 19, wherein when the intensity of the voice data is less than the first threshold, the means for selecting the at least one device is configured to select a single device of the plurality of devices as the at least one device for unicast communication in the unicast communication mode.

21. The apparatus of claim 20, wherein:
when the intensity of the voice data is less than the second threshold and greater than or equal to the first threshold, the means for selecting the at least one device is configured to select multiple devices of the plurality of devices as the at least one device for multicast communication in the multicast communication mode; and
when the intensity of the voice data is greater than or equal to the second threshold, the means for selecting is configured to select the plurality of devices as the at least one device for broadcast communication in the broadcast communication mode.

22. A non-transitory computer-readable medium comprising computer-executable instructions that, when executed by one or more processors of an apparatus, cause the apparatus to perform a method of providing communication in a virtual world, the method comprising:
receiving, via one or more microphones, voice data of a user corresponding to an avatar in the virtual world;
selecting a communication mode based on an intensity of the voice data of the user, a first threshold, and a second threshold, wherein the selecting comprises:
selecting a unicast communication mode when the intensity of the voice data of the user is less than the first threshold;
selecting a multicast communication mode when the intensity of the voice data of the user is less than the second threshold and greater than or equal to the first threshold; and
selecting a broadcast communication mode when the intensity of the voice data of the user is greater than or equal to the second threshold; and
communicating the voice data of the user, using the selected communication mode, to at least one device of a plurality of devices associated with a plurality of other avatars in the virtual world.

23. The non-transitory computer-readable medium of claim 22, wherein the method further comprises selecting the at least one device based on a gesture performed by the user and on the intensity of the voice data of the user.

24. The non-transitory computer-readable medium of claim 23, wherein selecting the at least one device is based on whether the intensity of the voice data satisfies the first threshold.

25. The non-transitory computer-readable medium of claim 24, wherein when the intensity is less than the first threshold, selecting the at least one device comprises selecting a single device of the plurality of devices for unicast communication in the unicast communication mode.

26. The non-transitory computer-readable medium of claim 25, wherein:
when the intensity of the voice data is greater than or equal to the first threshold, selecting the at least one device comprises selecting multiple devices of the plurality of devices; and
when the intensity of the voice data is greater than or equal to the second threshold, selecting the at least one device comprises selecting the plurality of devices for broadcast communication in the broadcast communication mode.

27. A method of providing communication in a virtual world, comprising:
receiving voice data of a user corresponding to an avatar in the virtual world;
selecting a communication mode based on (i) a comparison of an intensity of the voice data to a first threshold and a second threshold, and (ii) a proximity or orientation of the avatar to each of a plurality of other avatars in the virtual world, wherein:
the proximity or the orientation is to support a conversation among the user and at least one device of a plurality of devices associated with the plurality of other avatars; and
the selecting comprises:
selecting a unicast communication mode when the intensity of the voice data of the user is less than the first threshold;
selecting a multicast communication mode when the intensity of the voice data of the user is less than the second threshold and greater than or equal to the first threshold; and
selecting a broadcast communication mode when the intensity of the voice data of the user is greater than or equal to the second threshold; and
communicating the voice data of the user, using the selected communication mode, to the at least one device of the plurality of devices.

28. The method of claim 27, further comprising selecting the at least one device based on an avatar type of the avatar corresponding to the user.

* * * * *